US012573292B2

(12) United States Patent
Normington

(10) Patent No.: US 12,573,292 B2
(45) Date of Patent: Mar. 10, 2026

(54) VEHICLE IDENTIFICATION USING ADVANCED DRIVER ASSISTANCE SYSTEMS (ADAS)

(71) Applicant: NEOLOGY, INC., San Diego, CA (US)

(72) Inventor: Luke Joseph Normington, Poole (GB)

(73) Assignee: NEOLOGY, INC., San Diego, CA (US)

( * ) Notice: Subject to any disclaimer, the term of this patent is extended or adjusted under 35 U.S.C. 154(b) by 0 days.

(21) Appl. No.: 17/703,522

(22) Filed: Mar. 24, 2022

(65) Prior Publication Data

US 2022/0309914 A1     Sep. 29, 2022

Related U.S. Application Data

(60) Provisional application No. 63/165,421, filed on Mar. 24, 2021.

(51) Int. Cl.
*G08G 1/017*     (2006.01)
*G06F 16/51*     (2019.01)
*G06F 16/532*     (2019.01)

(52) U.S. Cl.
CPC ........... *G08G 1/0175* (2013.01); *G06F 16/51* (2019.01); *G06F 16/532* (2019.01)

(58) Field of Classification Search
CPC ...... G08G 1/0175; G08G 1/017; G06F 16/51; G06F 16/532
See application file for complete search history.

(56) References Cited

U.S. PATENT DOCUMENTS

| | | | |
|---|---|---|---|
| 2014/0201064 A1 | 7/2014 | Jackson et al. | |
| 2015/0302744 A1* | 10/2015 | Lin | G08G 1/0175 |
| | | | 705/311 |
| 2020/0005562 A1 | 1/2020 | Ibing | |
| 2021/0009157 A1 | 1/2021 | Fukuda et al. | |
| 2021/0067745 A1 | 3/2021 | Rosenberg et al. | |
| 2021/0241208 A1* | 8/2021 | Tang | G06N 3/045 |
| 2021/0272462 A1* | 9/2021 | Yang | G08G 1/20 |
| 2022/0036728 A1* | 2/2022 | Ucar | G08G 1/0141 |
| 2022/0044024 A1* | 2/2022 | Sambo | G06T 17/00 |

OTHER PUBLICATIONS

Extended European Search Report for corresponding EP Application 22164246.5 dated Aug. 19, 2022 in 10 pages.
Examination Report mailed Feb. 4, 2025 in European Application No. 221654246.5, 8 pages.

* cited by examiner

*Primary Examiner* — Aleksandr Kerzhner
*Assistant Examiner* — Aryan D Toughiry
(74) *Attorney, Agent, or Firm* — Buchalter LLP

(57)     ABSTRACT

A system for automated vehicle identification and detection. The system may utilize native, in-vehicle advanced driver-assistance (ADAS) systems. Native, in-vehicle sensors may include sensors installed by vehicle manufacturers as part of the building of the vehicle for the purposes of assisting drivers in driving and parking functions (i.e., as part of an ADAS system). The system may process data from the native sensors and cameras to obtain features indicative of vehicles in the surroundings proximate to the vehicle on which the ADAS system is installed.

9 Claims, 5 Drawing Sheets

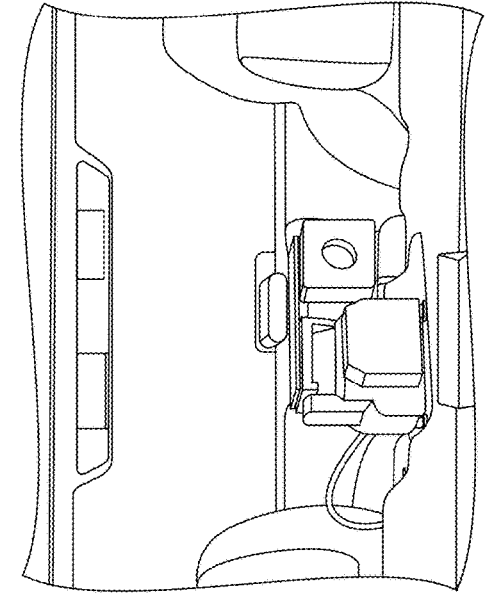
FIG. 1A
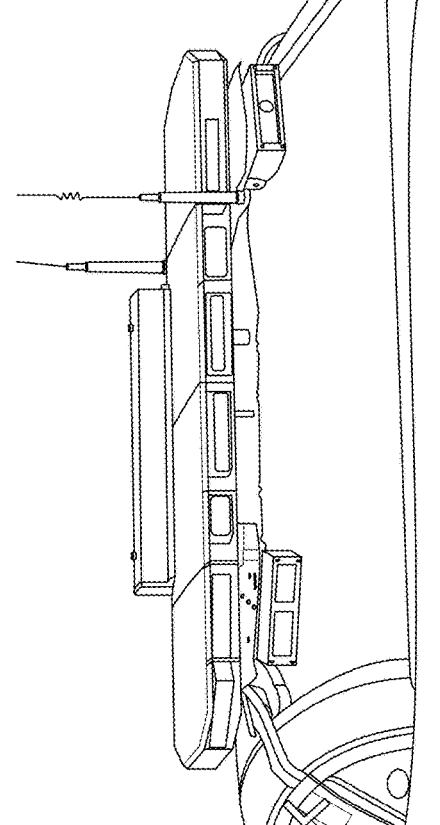
FIG. 1B
FIG. 1C

400

Obtain feed(s) from ADAS                          402

Extract feature(s) from feed(s)                   404

Associate feature(s) with feed(s) to generate data package                          406

Store data package                                408

VEHICLE IDENTIFICATION USING ADVANCED DRIVER ASSISTANCE SYSTEMS (ADAS)

RELATED APPLICATIONS

This application claims priority to U.S. Provisional Application, 63/165,421, filed Mar. 24, 2021, entitled "VEHICLE IDENTIFICATION USING ADVANCED DRIVER ASSISTANCE SYSTEMS (ADAS)," the contents of which is incorporated herein by reference in its entirety.

TECHNICAL FIELD

This present disclosure relates to a system for detection and identification of vehicles. More specifically, the present disclosure is directed to detection and identification of vehicles using in-vehicle Advanced Driver Assistance Systems (ADAS).

BACKGROUND

Various traditional systems for detection and identified vehicles exist. For example, security, law enforcement, traffic monitoring entities, parking monitoring entities, government entities, and the like utilize various image capture and other systems to detect, identify and track vehicles on a roadway for traffic monitoring and/or enforcement activities.

One traditional approach is through a mixture of automatic license plate recognition (ALPR) (also referred to as automatic number plate recognition or ANPR), radar, LiDAR, inductive loops and vision tracking techniques to generate potential violation events. A fusion of these techniques typically creates a dataset including an image or video file, as well as associated metadata to demonstrate unique event identifiers such as time and location of the event captured. However, many of these systems require the use of bespoke vehicle mounted devices. The sole purpose of these bespoke systems is the creation of vehicle detection events for traffic monitoring and/or enforcement purposes. Such conventional systems typically involve mounting bespoke image system hardware, distinct from hardware native to the vehicle (e.g., as installed by an original equipment manufacture or distributor of the vehicle). For example, additional bespoke imaging system may be installed in-vehicle as shown in FIGS. 1A and 1B or as roof-mounted cameras as shown in FIG. 1C.

This additional hardware, designed for a specific use, means converting the use of the systems to a different application or platform, as may be required by some law enforcement agencies, can prove difficult and prohibitive. Furthermore, these bespoke systems typically involve several man-hours of installation to permanently install the equipment into the vehicle (including removal of roof-liner, power connections, etc.). However, with many agencies now having vehicles on lease arrangements, limitations are in place by the leasing companies that impede installation of these bespoke systems. For example, lease agreements may not permit drilling holes into the body of the vehicles to secure the bespoke equipment. Additionally, such systems can limit usability of the technology in achieving optimal placement. For example, a bespoke dash-mounted camera should not limit the view of the driver and additional screens may limit usability of a main in-vehicle screen.

Aside from the automated systems described above, other example solutions to vehicle detection and identification include manual approaches. For example, manual, in-person enforcement involving enforcement personnel required to manually monitor roadways and create citations for placement onto the windshield of offending vehicles. As another example, manual remote enforcement has involved the use of closed-circuit television (CCTV) systems to manually monitor roadways remotely and, in the event of an infraction being identified, manual gathering of the appropriate evidence to demonstrate the infringement has taken place. Such approaches result in "offline" data processing to identify who the owner of a vehicle is through numerous databases and then posting a citation to the address of the registered vehicle owner.

SUMMARY

Embodiments described herein provide various systems and methods for automated vehicle identification and detection that overcome the shortcomings of the conventional systems. For example, embodiments herein provide systems and methods for the detection and identification of vehicles using native, in-vehicle advanced driver-assistance (ADAS) related systems. Embodiments herein utilize in-vehicle ADAS systems, native to the vehicle, to consume ADAS data (e.g., data generated by the ADAS system) and create unique identification data vehicles detected in the ADAS data. The identification data may be used to provide location, time, speed and vehicle characteristics (e.g., license plate details, vehicle type/make/model/color/characteristics, etc.) as well as identifying possible infractions and/or violations performed by the vehicle. Embodiments herein are particularly well suited for the purpose of, for example but not limited to, traffic monitoring on a roadway and for enforcement activities.

Other features and advantages of the present inventive concept should be apparent from the following description which illustrates by way of example aspects of the present inventive concept.

BRIEF DESCRIPTION OF THE DRAWINGS

Various embodiments disclosed herein are described in detail with reference to the following figures. The drawings are provided for purposes of illustration only and merely depict typical or example embodiments. These drawings are provided to facilitate the reader's understanding and shall not be considered limiting of the breadth, scope, or applicability of the embodiments. It should be noted that for clarity and ease of illustration these drawings are not necessarily made to scale.

FIGS. 1A-1C are screen shots of conventional bespoke vehicle mounted systems;

Figure 2:
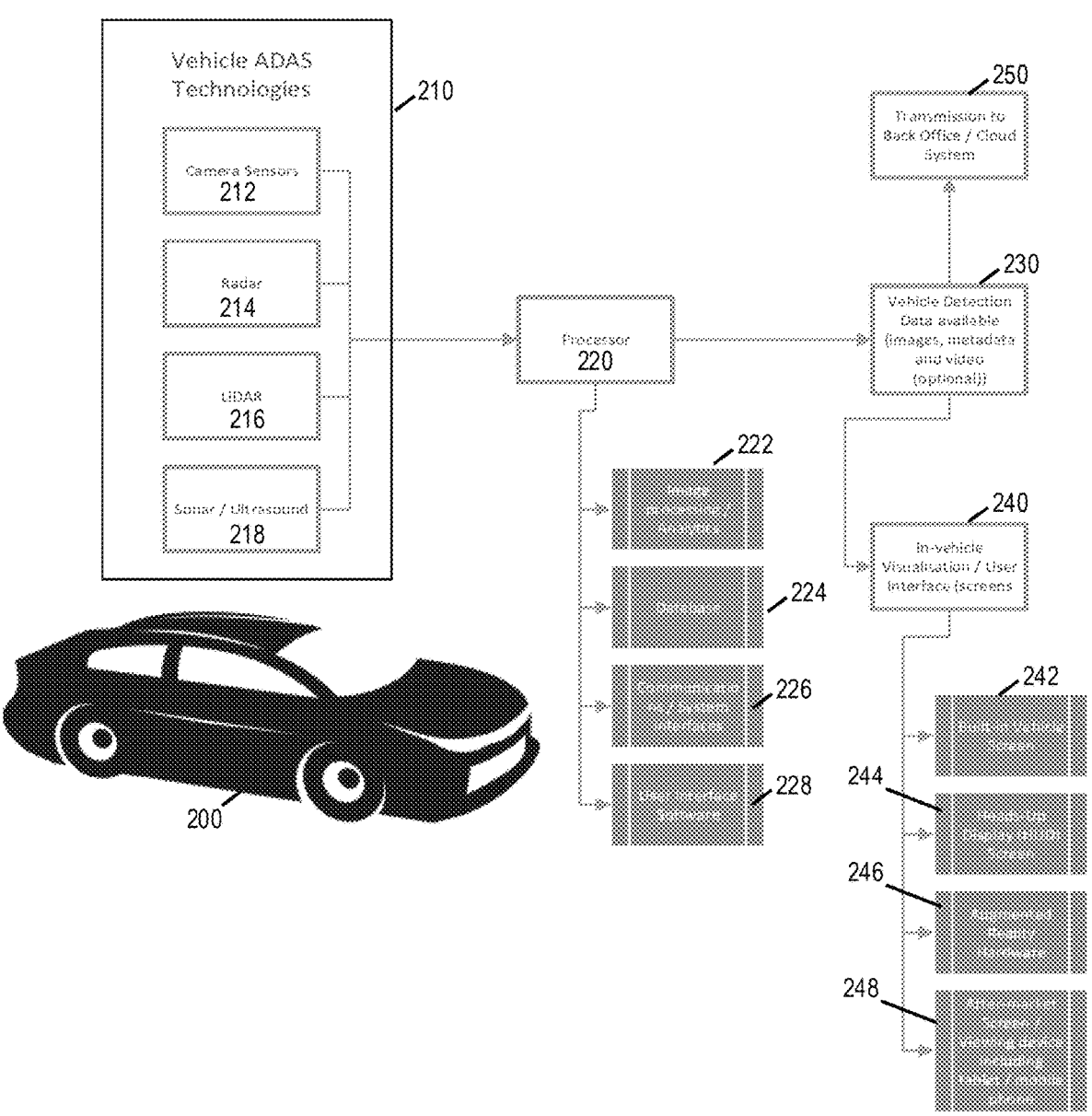
FIG. 2 illustrates a schematic functional block diagram of a vehicle identification system in accordance with various aspects of the present disclosure.

The various embodiments mentioned above are described in further detail with reference to the aforementioned figures and the following detailed description of exemplary embodiments.

DETAILED DESCRIPTION

Embodiments disclosed herein provide methods and systems for utilizing ADAS systems for vehicle identification and detection. Embodiments herein provide methods and system for identification of vehicle characteristics, such as but not limited to license plate information and identifying characteristic information, using one or more native, in-vehicle sensors. Native, in-vehicle sensors may include sensors installed by vehicle manufactures as part of the building the vehicle. For example, sensors may include such sensors and/or cameras installed in the vehicle as part of a ADAS. ADAS are electronic systems that assist drivers in driving and parking functions. ADAS systems use automated technology, such as sensors and cameras, to detect nearby obstacles or driver errors, and respond accordingly.

As used herein the term feed may refer to a single instance of ADAS data generated by an ADAS. For example, a native camera of an ADAS may generate image or video data for use in an ADAS. This image and/or video data may be referred to as ADAS data or a feed. ADAS data is not intended to be limited to a single instance and may refer to one or more instances of ADAS data (e.g., a collection of image frames as a video or a plurality of GPS coordinates over time). Whereas reference to a single feed may refer to a single instances, and reference to feeds may refer to a plurality of instances.

This patent application is related to U.S. application Ser. No. 17/033,506, entitled "AUTOMATIC LICENSE PLATE RECOGNITION (ALPR) AND VEHICLE IDENTIFICATION PROFILE METHODS AND SYSTEMS", filed Sep. 25, 2020, the disclosure of which is incorporated herein by reference in its entirety. However, embodiments of the present disclosure utilize ADAS data obtained from one or more sensors natively installed in the vehicle as part of the ADAS instead of bespoke data capture systems designed specifically for use in vehicle identifier and detection. For example, unlike conventional systems which require bespoke sensors and cameras, embodiments of the present disclosures communicatively coupled to the ADAS of a vehicle and obtains ADAS data therefrom. For example, embodiments herein may be communicatively coupled (e.g., via wired or wireless interface) to sensor(s) of the ADAS. As another example, the embodiments herein may be communicatively coupled to an on-board computer system of the vehicle (e.g., a computer system installed by the manufacturing for executing the ADAS) and obtain ADAS therefrom. The ADAS data is processed to obtain features indicative of at least vehicle in the surroundings proximate to the vehicle on which the ADAS is installed and generate unique data packages for each vehicle identified in the surroundings. Each unique data package may be used to identify the vehicles in the surroundings.

FIG. 2 illustrates a schematic functional block diagram of a vehicle identification system in accordance with various aspects of the present disclosure. FIG. 2 depicts a vehicle 200 having a plurality of sub-systems. The sub-systems of vehicle 200 includes at least a plurality of native, in-vehicle sensors 212-218. The sensors 212-218 include, for example, various sensors that are natively installed in the vehicle as part of various ADAS 210, such as but not limited to, camera sensor(s) 212, radar sensor(s) 214, LiDAR sensor(s) 216, and sonar/ultrasound sensor(s) 218. The sensors 212-218 may also comprise a GPS receiver (not shown) for determining geographic locations of the vehicle.

Figure 5:
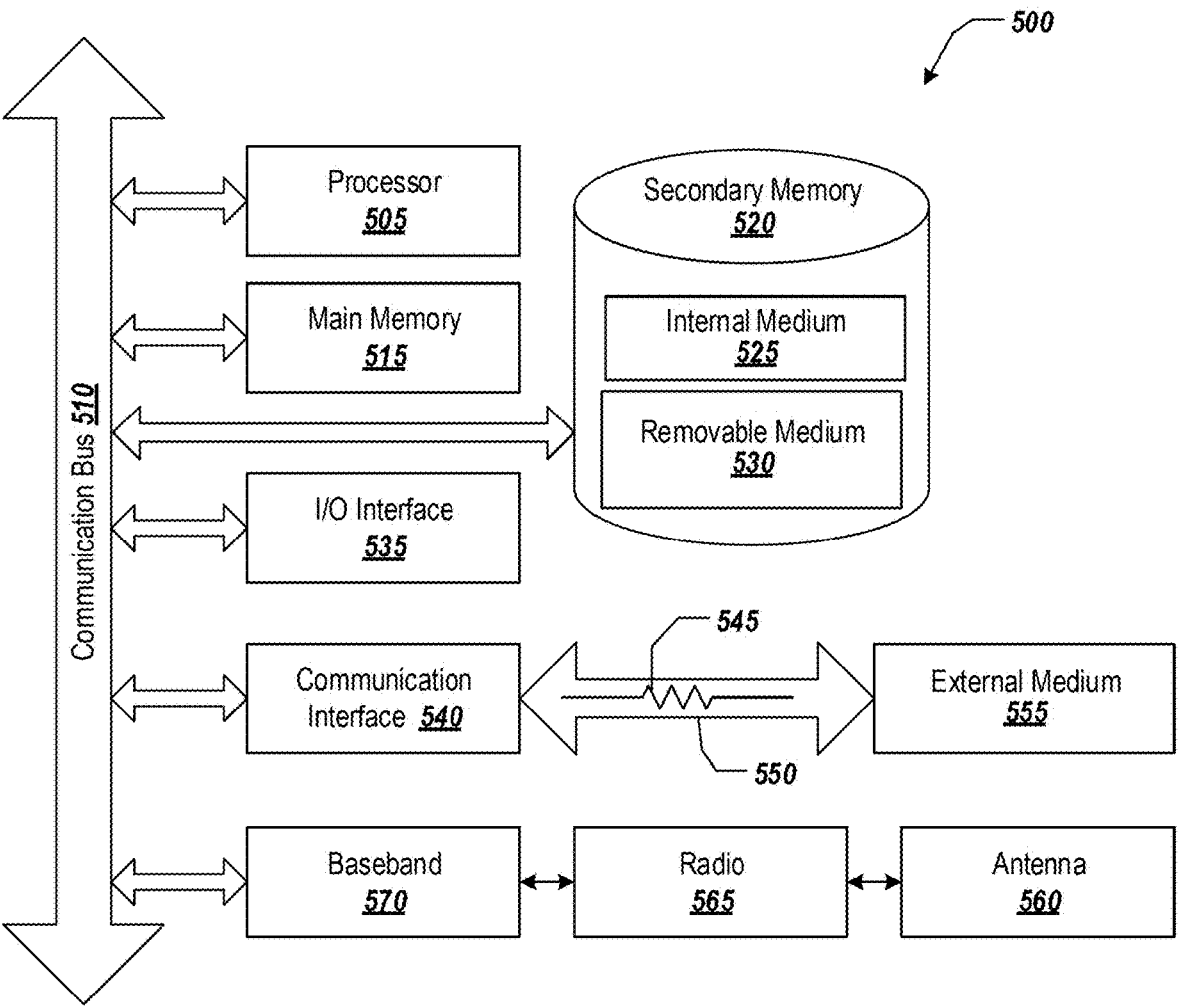
FIG. 5 illustrates an example wired and/or wireless computer device suitable for use in the systems disclosed herein.

The ADAS 210 may be communicatively coupled (e.g., wired or wireless) to a computing device 220 (e.g., such as computer device 500 of FIG. 5). In an illustrative embodiment, the computing device 220 may distinct from the vehicle 200, for example, the computing device may be coupled to ADAS 210 via an input/output port connected to an native, on-board computer (not shown) of the vehicle. For example, in some vehicles, an input/output port may be located in the glovebox and a wired connection can be established with the on-board computer of the vehicle. Through the wired connection ADAS data from the ADAS 210 may be obtained by the computing device 220. As another example, ADAS data may be consumed through a wireless connection (e.g., on-board Wi-Fi, Bluetooth, etc.) assuming proper authentication is established between the ADAS 210 and the computing device 220.

In various examples, ADAS data from an ADAS 210 may be in a first format based on the vehicle 200. That is, each vehicle original equipment manufacturer (OEM) may have a proprietary format in which ADAS data is presented. In some embodiments, the first format be an open source format. In each example, the first format is selected by the OEM for formatting the ADAS data. Accordingly, the computing device 220 may obtain ADAS data in the first format and reformat the ADAS data into a second format recognizable and usable by the computing device 220.

The computing device 220 may comprise an image processor 222 executing image processing software configured to perform one or more image processing techniques to recognize and extract features from obtained ADAS data, for example, where ADS data is presented as image data feed. For example, the image processor 222 may be configured to recognize vehicle identifiable characteristics and license plate numbers, for example, as described in U.S. application Ser. No. 17/033,506, entitled "AUTOMATIC LICENSE PLATE RECOGNITION (ALPR) AND VEHICLE IDENTIFICATION PROFILE METHODS AND SYSTEMS", filed Sep. 25, 2020, the disclosure of which is incorporated herein by reference in its entirety.

The ADAS data and recognized features may be stored to a database 224 of the computing system and communicated to external systems and user interfaces via communication/system interface 226. The computing device 222 may also comprise user interface software 228 for communicating to in-vehicle visualization system and user interface 240. For example, the user interface software 228 may be configured to generating graphical user interfaces on user interface 240 and receiving user input commands therefrom.

In a manner similar to that described in U.S. application Ser. No. 17/033,506, ADAS data may be obtained by the computing device 220 and features extracted therefrom and associated with a respective ADAS data as metadata. The computing device 220 generates a data package 230 by combining (e.g., associating) the ADAS data feed with extracted features as metadata and then communicating the data package to downstream systems for additional processing. The data package may be unique for given object (e.g., vehicle) detected within a respective feed and comprise the metadata for identifying and characterizing the object. The feed may include ADAS data as image data, and, optionally, may also include a video feed (e.g., a plurality of image feeds) for a predetermined time before and after the respective feed. That is, based on a timestamp for a given data package 230, a collection for image frames for a predetermined amount of time before and/or after the feed may be grouped as video data.

The computing device 220 may communicate the data package 230 to the in-vehicle visualization/user interface 240 via the user interface software 228 and/or communication system interface 226. The in-vehicle user interface 240 may comprise, for example, one or more of a built-in vehicle display screen 242, heads-up display (HUD) 244, augmented reality hardware 246, and personal user device 248

(e.g., tablets, laptops, mobile phone, smart watch, or any other electronic device). Through the user interface 240 an occupant of the vehicle 200 may view and interact with a data package 230 and contents therein. Additionally, the user may request further processing, as described below, through the interface.

The computing device 220 may also communicate the data package to back end system 250 (e.g., such as those described in U.S. application Ser. No. 17/033,506) and/or a cloud-based database storage system via communication interface 226. In some embodiments, the back end system 250 may perform the additional processing, as described below, for example, automatically search a database of known vehicles (e.g., vehicle profiles) in response to receiving a data package 230 and/or in response to a user request executed on a data package 230 via the user interface 240.

Additional processing may include aggregating the features and one or more feeds to produce a vehicle profile, for example, as described in U.S. application Ser. No. 17/033, 506 and US App. No. (UNASSIGNED), titled "VEHICLE IDENTIFICATION PROFILE METHODS AND SYSTEMS AT THE EDGE" filed on Mar. 24, 2012. As another example, alone or in combination, the data package may be compared against known vehicle profiles based on a commonality between identifying characteristics included in the vehicle profiles and the metadata of the data package. Each vehicle profile may be associated with situational information regarding the vehicle, such as but not limited to, prior known criminal/illegal behavior associated with a respective vehicle; vehicle permissions associated with a respective vehicle (for example, parking permits and/or where restricted roadway limits are applied, exemptions for certain vehicle types based on emissions, size of vehicle, ownership of vehicle, vehicle agency association, etc.); previous usage associated with a respective vehicle (e.g., where a detected vehicle has been observed previously in a given geographic area and/or location). In some examples, the data package may be compared with geographical usage information and time stamp information (e.g., map/GPS coordinates over time) to identify on a map where the observed vehicle was seen over a predetermined time period (e.g., 0-365 days).

The computing device 220 may be configured to performed one or more of the above listed comparisons in conjunction with one or more of the other comparisons to correlate a detected vehicle at geographic location and time with situational information to assist enforcement personnel in locating a vehicle that has been associated with criminal or infringing activity. That is, for example, a previous instance of criminal behavior may be associated with a vehicle profile in a database (e.g., on-board vehicle 200 or remote on the back end 250) and the feed obtained from the ADAS 210 may be used to detect vehicle features so to identify a vehicle in the surrounds. The detected features may be used to search the database of known vehicle profiles and if a hit is recognized notify enforcement personnel on one or more of the user interfaces 240, via user interface software 228, of the detected vehicle and previous criminal activity. Alternatively or in combination with the preceding notification, unique data package of a detected vehicle may be transmitted to a separate, remote databased system, such as back end system 250 and the additional processing described above executed at the back end system 250.

Figure 3:
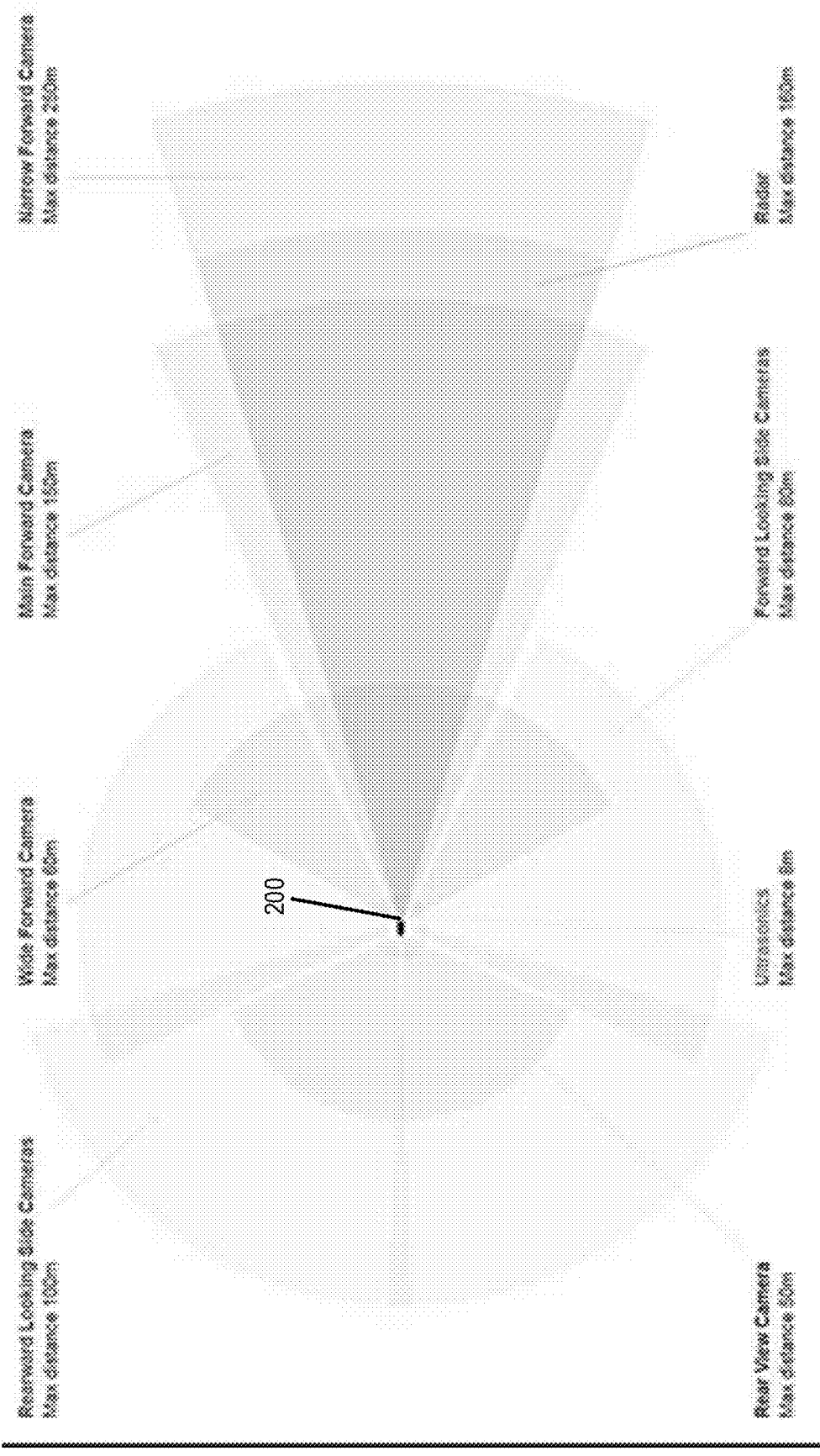
FIG. 3 is a schematic diagram of a sensor angular and distance ranges for a plurality of native sensors of an ADAS.

FIG. 3 is a schematic diagram of a sensor angular and distance ranges for a plurality of native sensors on the vehicle. For example, the vehicle 200 of FIG. 2 includes the plurality of sensors 212-218, where each triangular shaded of FIG. 3 region represents a different angular detection range of a given sensor that extends over a different distance from the vehicle 200. Through the use of multiple native, in-vehicle sensors, detection of surrounding vehicles can be performed in a full 360 degrees around the vehicle 200 at varying distances from the vehicle 200.

Figure 4:
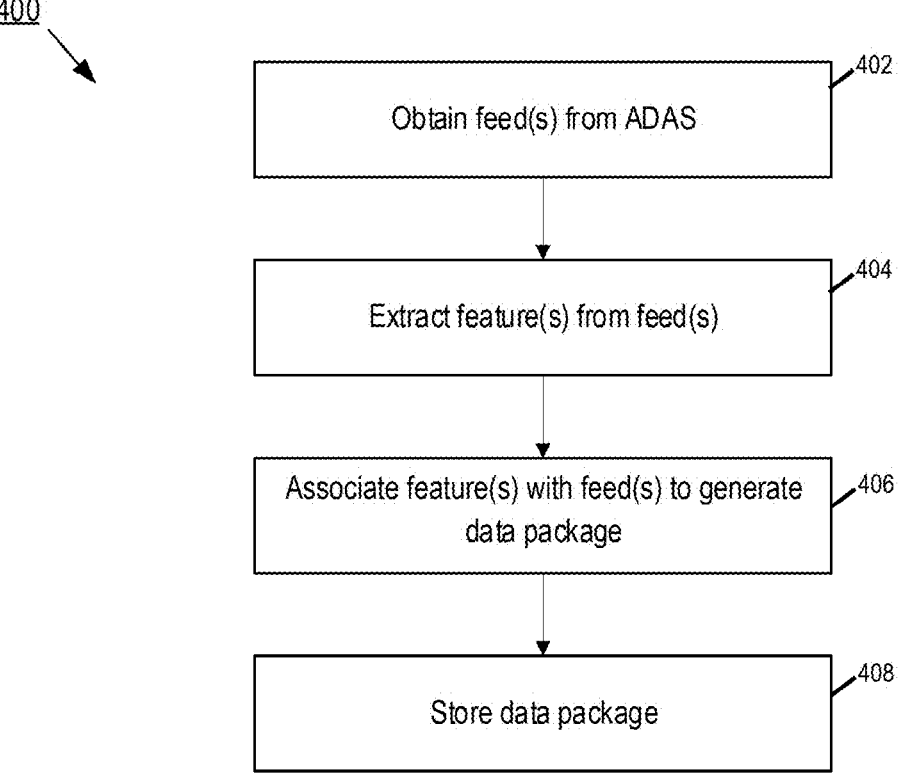
FIG. 4 illustrates an example process flow 400 for vehicle identification and detection in accordance with various aspects of the present disclosure.

FIG. 4 illustrates an example process flow 400 for vehicle identification and detection in accordance with various aspects of the present disclosure. Process 400 may be performed by a processor executing instructions stored in memory, for example, computing device 220 of the vehicle identification system of FIG. 2.

At step 402, ADAS data in the form of one or more data feeds are obtained from one or more ADAS sensors of the vehicle. For example, as explained above, one or more ADAS sensors (e.g., one or more of sensors 212-218) acquire ADAS data, images, and/or video feeds as part of the ADAS operations. The computing device 220 is communicatively coupled to the one or more ADAS sensors and consumes these feeds. That is, via an input/output wired or wireless connection, the computing device 220 may receive each feed. Feeds may be received one at a time sequentially or a block of related feeds (e.g., a video or collection of GPS data).

In various examples, feeds from an ADAS system may be in a first format that is based on the vehicle 200. As explained above, each OEM may have a proprietary format or an open source format selected for ADAS data. Accordingly, step 402 may include obtaining ADAS data in a first format and reformatting the ADAS data into a second format that can be processed according to the embodiments herein.

For example, vehicles produced by Tesla, Inc. come with "Dashcam Viewer" software preinstalled in the vehicle. The Dashcam Viewer software that uses ADAS cameras natively installed on the vehicle for surveillance. This software platform also includes a "Sentry Mode", an integrated surveillance system that uses the native ADAS cameras installed on the vehicle to display the video streams. Sentry mode permits recording to an storage device via an input/output port of the vehicle (e.g., a USB port or other electrical connection for transfer of data files). However, to properly retrieve and utilize these vides on the storage device, the device drive must be properly formatted, for example the drive must have file system FAT32 (Windows) or ext4 (Linux), otherwise the files will not properly transfer. Thus, embodiments herein may comprise a temporary storage device formatted in either FAT32 or ext4 for obtaining the video streams and then converting the obtained data files into a format for use as described herein. For example, database 224 may comprise a portion of which that is formatted accordingly or another data storage device may be provided.

At step 404, one or more features are extracted from the obtained ADAS data. For example, each obtained ADAS data feed may be processed via the computing device 220 in a manner similar to that described in U.S. application Ser. No. 17/033,506. For example, the computing device 220 extracts features from ADAS data to identify a vehicle; determine license plate characters; vehicle identifying characteristics (e.g., vehicle make; vehicle type such as sedan, coupe, SUV, etc.; vehicle model, vehicle color, unique features, etc.); roadway conditions (e.g., features indicating restricted roadways or unrestricted, parking spaces, no-waiting regions, bus lanes, etc.); pedestrians and surrounding persons (e.g., in case of an accident and/or vehicle theft); etc. In various examples, GPS coordinate data, audio, time stamps, etc. may also be extracted from the ADAS data feed. Any signals generated by the one or more sensors of the ADAS may consumed to extract features. In an example, descriptors of each extracted feature may be generated, for example, as described in U.S. application Ser. No. 17/033, 506.

At step 406, each feature extracted at step 404 is associated with the respective ADAS data feed from which the feature was extracted. For example, computing device 220 may comprise a compiler module configured to combine extracted features from step 404 with the obtained ADAS data feed from step 402. In an example, descriptors are generated for extracted features and the descriptors may be embed or otherwise associated with the respective ADAS data feed, for example, as metadata associated therewith. In some examples, a probability value for the extracted feature (and/or descriptor) maybe determined based on the confidence of the feature extraction and/or descriptor designation process.

At step 406, in some embodiments, the ADAS data feed and extracted feature(s) may be combined to generate a unique data package. For example, a unique data package may be generated for each vehicle detected in a given ADAS data feed (e.g., based on the extracted features), such as vehicles within the environment and proximate to the vehicle on which the ADAS is installed. The unique data package may include the extracted features (and/or descriptors) and the ADAS data feed for the detected vehicle. The data package may include the extracted features (and/or descriptors) as metadata attached to the feed. The data package may optionally include video data of sequential image frames that contain the detected vehicle. Similarly, a unique data package may be generated for recognized objects and/or persons contained in a given feed.

At step 408, the unique data package is stored in a database (e.g., databased 224 of FIG. 2) for subsequent retrieval and/or processing. For example, a data package may be used to generate a vehicle identification profile, such as for example, the processes described in U.S. application Ser. No. 17/033,506 and US App. No. (UNASSIGNED), titled "VEHICLE IDENTIFICATION PROFILE METHODS AND SYSTEMS AT THE EDGE" filed on Mar. 24, 2012. Examples of which are also described above in connection to FIG. 2.

FIG. 5 illustrates an example wired and/or wireless computer device suitable for use in the systems disclosed herein. Referring to FIG. 2, the system 500 may be used to implement the vehicle identification system 200 the computing device 220, and/or the back end system 250. The system 500 may be programmed with software comprising instructions that, when executed by at least one processor, cause the system 50 to perform the various functions, processes, and/or methods described herein, for example, as described in connection to FIGS. 2-4.

In various embodiments, the system 500 can be a conventional personal computer, computer server, personal digital assistant, smart phone, tablet computer, or any other processor-enabled device that is capable of wired or wireless data communication. Other computer systems and/or architectures may be also used, as will be clear to those skilled in the art.

The system 500 preferably includes one or more processors, such as processor 505. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 505.

The processor 505 is preferably connected to a communication bus 510. The communication bus 510 may include a data channel for facilitating information transfer between storage and other peripheral components of the system 500. The communication bus 510 further may provide a set of signals used for communication with the processor 505, including a data bus, address bus, and control bus (not shown). The communication bus 510 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 500 preferably includes a main memory 515 and may also include a secondary memory 520. The main memory 515 provides storage of instructions and data for programs executing on the processor 505. For example, the main memory 515 may provide storage software modules or engines that, when executed by the processor 505, perform the functions described in FIGS. 2-4. As another example, the main memory 515 may be illustrative of one or more of databases 224, and thus provide storage of the data and information stored therein. The main memory 515 is typically semiconductor-based memory such as dynamic random dom access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 520 may optionally include an internal memory 525 and/or a removable storage medium 530, for example a floppy disk drive, a magnetic tape drive, a compact disc ("CD") drive, a digital versatile disc ("DVD") drive, etc. The removable storage medium 530 is read from and/or written to in a well-known manner. Removable storage medium 530 may be, for example, a floppy disk, magnetic tape, CD, DVD, SD card, etc.

The removable storage medium 530 is a non-transitory computer readable medium having stored thereon computer executable code (i.e., software) and/or data. The computer software or data stored on the removable storage medium 530 is read into the system 500 for execution by the processor 505.

In alternative embodiments, the secondary memory 520 may include other similar means for allowing computer programs or other data or instructions to be loaded into the system 500. Such means may include, for example, an external storage medium 555 and a communication interface 540. Examples of external storage medium 555 may include an external hard disk drive or an external optical drive, or and external magneto-optical drive.

Other examples of secondary memory 520 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are the removable storage medium 530 and a communication interface, which allow software and data to be transferred from an external storage medium 555 to the system 500.

System 500 may also include an input/output ("I/O") interface 535. The I/O interface 535 facilitates input from and output to external devices. For example, the I/O interface 535 may receive input from a keyboard, mouse, touch screen, gestures detecting camera, speech command module, etc. and may provide output to a display generated by the graphical user interface. The I/O interface 535 is capable of facilitating input from and output to various alternative types of human interface and machine interface devices alike. For example, the I/O interface 535 may comprise the user interface software 228 for communicating with the user interfaces 240. In another example, the I/O interface 535 may be an input/output connection for transmission of feeds from the ADAS 210 to the processor 220.

System 500 may also include a communication interface 540. The communication interface 540 allows software and data to be transferred between system 500 and external devices, networks, or information sources. For example, feeds may be transferred to system 500 from a an ADAS sensor via communication interface 540. Examples of communication interface 540 include a modem, a network interface card ("NIC"), a wireless data card, a communications port, a PCMCIA slot and card, an infrared interface, and an IEEE 1394 fire-wire, just to name a few.

Communication interface 540 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 540 are generally in the form of the electrical communication signals 545. The electrical communication signals 545 are preferably provided to the communication interface 540 via a communication channel 550. In one embodiment, the communication channel 550 may be a wired or wireless network, or any variety of other communication links. The communication channel 550 carries the electrical communication signals 545 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 515 and/or the secondary memory 520. Computer programs can also be received via the communication interface 540 and stored in the main memory 515 and/or the secondary memory 520. Such computer programs, when executed, enable the system 500 to perform the various functions of the present invention as previously described.

In this description, the term "computer readable medium" is used to refer to any non-transitory computer readable storage media used to provide computer executable code (e.g., software and computer programs) to the system 500. Examples of these media include the main memory 515, the secondary memory 520 (including the internal memory 525, the removable storage medium 530, and the external storage medium 555), and any peripheral device communicatively coupled with the communication interface 540 (including a network information server or other network device). These non-transitory computer readable mediums are means for providing executable code, programming instructions, and software to the system 500.

In an embodiment that is implemented using software, the software may be stored on a computer readable medium and loaded into the system 500 by way of removable storage medium 530, I/O interface 535, or communication interface 540. In such an embodiment, the software is loaded into the system 500 in the form of electrical communication signals 545. The software, when executed by the processor 505, preferably causes the processor 505 to perform the inventive features and functions previously described herein.

The system 500 also includes optional wireless communication components that facilitate wireless communication over a voice and over a data network. The wireless communication components comprise an antenna system 560, a radio system 565 and a baseband system 570. In the system 500, radio frequency ("RF") signals are transmitted and received over the air by the antenna system 560 under the management of the radio system 565.

In one embodiment, the antenna system 560 may comprise one or more antennae and one or more multiplexors (not shown) that perform a switching function to provide the antenna system 560 with transmit and receive signal paths. In the receive path, received RF signals can be coupled from a multiplexor to a low noise amplifier (not shown) that amplifies the received RF signal and sends the amplified signal to the radio system 565.

In alternative embodiments, the radio system 565 may comprise one or more radios that are configured to communicate over various frequencies. In one embodiment, the radio system 565 may combine a demodulator (not shown) and modulator (not shown) in one integrated circuit ("IC"). The demodulator and modulator can also be separate components. In the incoming path, the demodulator strips away the RF carrier signal leaving a baseband received audio signal, which is sent from the radio system 565 to the baseband system 570.

If the received signal contains audio information, then baseband system 570 decodes the signal and converts it to an analog signal. Then the signal is amplified and sent to a speaker. The baseband system 570 also receives analog audio signals from a microphone. These analog audio signals are converted to digital signals and encoded by the baseband system 570. The baseband system 570 also codes the digital signals for transmission and generates a baseband transmit audio signal that is routed to the modulator portion of the radio system 565. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 560 where the signal is switched to the antenna port for transmission.

The baseband system 570 is also communicatively coupled with the processor 505. The processor 505 has access to one or more data storage areas including, for example, but not limited to, the main memory 515 and the secondary memory 520. The processor 505 is preferably configured to execute instructions (i.e., computer programs or software) that can be stored in the main memory 515 or in the secondary memory 520. Computer programs can also be received from the baseband processor 570 and stored in the main memory 515 or in the secondary memory 520, or executed upon receipt. Such computer programs, when executed, enable the system 500 to perform the various functions of the present invention as previously described. For example, the main memory 515 may include various software modules (not shown) that are executable by processor 505.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described can be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While various embodiments have been described above, it should be understood that they have been presented by way of example only, and not of limitation. The breadth and scope should not be limited by any of the above-described example embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components can be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases can be absent.

While various embodiments have been described above, it is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Although the present disclosure provides certain example embodiments and applications, other embodiments that are apparent to those of ordinary skill in the art, including embodiments which do not provide all of the features and advantages set forth herein, are also within the scope of this disclosure.

What is claimed is:

1. A vehicle identification method, the method comprising:

obtaining, by a processor, advanced driver assistance systems (ADAS) data from one more sensors natively installed on a first vehicle, the ADAS data comprising information representative of an environment surrounding the vehicle;

extracting, by the processor, one or more features from the obtained ADAS data, the feature comprising identifying characteristics of at least a second vehicle proximate to the first vehicle;

combining, by the processor, the obtained ADAS data with the extracted features to generate a unique data package for the at least a second vehicle; and storing the unique data package in a database;

comparing the features in the unique data package against features in a plurality of vehicle profiles stored in a second database and identifying a vehicle match in the database based on the comparison;

based on the vehicle match, associating the second vehicle with a combination of the following:

a prior known criminal/illegal behavior associated with a respective vehicle, including traffic violations or illegal activities linked to the vehicle;

vehicle permissions associated with a respective vehicle, including but not limited to, parking permits and/or where restricted roadway limits are applied;

usage information, including geographical area and/or location, used to associate the vehicle with prior known criminal/illegal behavior;

exemptions for certain vehicle types based on at least one of emissions, size of vehicle, ownership of vehicle, and vehicle agency association;

previous usage associated with a respective vehicle, including but not limited to where a detected vehicle has been observed previously in a given geographic area and/or location.

2. The method of claim 1, wherein the ADAS data comprises one or more of an image feed, video feed, audio feed, global positioning system (GPS) feed, LIDAR feed, sonar/ultrasound feed, and radar feed.

3. The method of claim 1, wherein the extracted information comprises one or more of a license plate number, vehicle identifying characteristics, and roadway conditions.

4. The method of claim 1, further comprising transmitting a notification of the match to a user interface.

5. The method of claim 1, wherein the database is a cloud storage database.

6. The method of claim 1, wherein the database is hosted at a back end system.

7. The method of claim 1, wherein the data package may be compared with geographical usage information and time stamp information to identify on a map where the observed vehicle was seen over a predetermined time period.

8. The method of claim 7, wherein the geographical usage information comprises map/GPS coordinates over time.

9. The method of claim 7, wherein the predetermined time period is 0-365 days.

* * * * *